US007768186B2

(12) United States Patent
Choi (10) Patent No.: US 7,768,186 B2
(45) Date of Patent: Aug. 3, 2010

(54) FLUORESCENT LAMP AND BACKLIGHT UNIT USING THE SAME, AND METHOD OF DRIVING THE BACKLIGHT UNIT

(75) Inventor: Jong Hyun Choi, Incheon-kwangyokshi (KR)

(73) Assignee: LG. Display Co., Ltd., Seoul (KR)

( * ) Notice: Subject to any disclaimer, the term of this patent is extended or adjusted under 35 U.S.C. 154(b) by 136 days.

(21) Appl. No.: 10/879,951

(22) Filed: Jun. 28, 2004

(65) Prior Publication Data

US 2005/0127839 A1  Jun. 16, 2005

(30) Foreign Application Priority Data

Dec. 12, 2003  (KR) .................. 10-2003-0090695

(51) Int. Cl.
*H01J 1/96* (2006.01)
*H01J 19/42* (2006.01)

(52) U.S. Cl. .................. 313/289; 313/262; 313/266; 313/290; 313/607; 455/26

(58) Field of Classification Search ............ 313/234, 313/607, 237, 262, 266, 289, 290, 623–625; 445/22, 23, 26, 27
See application file for complete search history.

(56) References Cited

U.S. PATENT DOCUMENTS

| | | | | |
|---|---|---|---|---|
| 3,562,629 A | * | 2/1971 | Troubetzkoi | ................ 323/370 |
| 3,649,864 A | * | 3/1972 | Willemsen | ................ 313/622 |
| 5,998,921 A | * | 12/1999 | Nakaya et al. | .............. 313/491 |
| 2004/0105046 A1 | * | 6/2004 | Taira et al. | ..................... 349/61 |
| 2004/0257793 A1 | * | 12/2004 | Wakabayashi | ............... 362/31 |

FOREIGN PATENT DOCUMENTS

| | | |
|---|---|---|
| JP | H09-245745 | 9/1997 |
| JP | 2002-279936 | 9/2002 |
| JP | 2003-178717 | 6/2003 |
| JP | 2003-197154 | 7/2003 |
| JP | 2003-346726 | * 12/2003 |
| KR | 2001-44259 | 6/2001 |

OTHER PUBLICATIONS

Office Action dated Dec. 15, 2006 for corresponding Japanese Patent Application No. 2004-197298.

* cited by examiner

*Primary Examiner*—Bumsuk Won
(74) *Attorney, Agent, or Firm*—Brinks Hofer Gilson & Lione (57) ABSTRACT

A fluorescent lamp includes an external electrode and an internal electrode provided at opposite ends of a fluorescent tube. A power conductor may connect to the internal electrode extend outside the tube to provide a connection point for the internal electrode. The tube may include an internal support element at a first end of the tube and a substantially self supporting second end of the tube. A method for assembling a backlight includes obtaining a fluorescent lamp with an external electrode at a first end of a tube, an internal electrode at a second end of the tube opposite the first end, and an internal support element at the second end of the tube. The first end of the tube may be substantially self supporting. The method also connects first and second drive connectors to the first and second ends of the tube.

16 Claims, 10 Drawing Sheets

FLUORESCENT LAMP AND BACKLIGHT UNIT USING THE SAME, AND METHOD OF DRIVING THE BACKLIGHT UNIT

CROSS REFERENCE TO RELATED APPLICATIONS

This application claims the benefit of Korean Patent Application No. P2003-90695 filed in Korea on Dec. 12, 2003. The disclosure of Application No. P2003-90695 is incorporated herein by reference.

BACKGROUND

1. Technical Field

This invention relates to display backlights and fluorescent lamps used in backlights.

2. Related Art

Cathode ray tubes (CRTs) are employed as display devices for many products. However, because of their size, weight, and power requirements, CRTs are generally unsuitable for small and light electronic products such as Personal Data Assistants (PDA), portable game machines, and other small products. Alternative displays have therefore been developed, such as liquid crystal display devices (LCDs) and plasma display panels (PDPs). LCDs find widespread use as flat display panels in laptop computers, desktop computers, televisions, and other devices because of their high quality image, lightness, thinness, compact size, and low power consumption.

LCDs display information by controlling transmittance of externally generated light through a liquid crystal layer. In some LCDs a backlight is placed behind the LCD panel to illuminate it. The backlight may be a direct illumination backlight or an edge illumination backlight.

In an edge illumination backlight, a lamp unit may be provided at a lateral side of a light-guiding plate. The lamp unit may include a fluorescent lamp, a protective lamp holder that receives one or both ends of the fluorescent lamp, and a reflective sheet that directs light emitted from the fluorescent lamp to the light-guiding plate. The edge illumination backlight may have a small enough profile to be used in small devices such as laptop computer displays to provide a uniform and long lighting life cycle.

Large LCDs, such as those used in televisions or large computer displays, may use a direct illumination backlight. In the direct illumination backlight, multiple fluorescent lamps may be arranged along a lower surface of a light-diffusion sheet to directly illuminate the LCD. The direct illumination backlight is more efficient than the edge illumination backlight and may provide more luminance.

Figure 1:
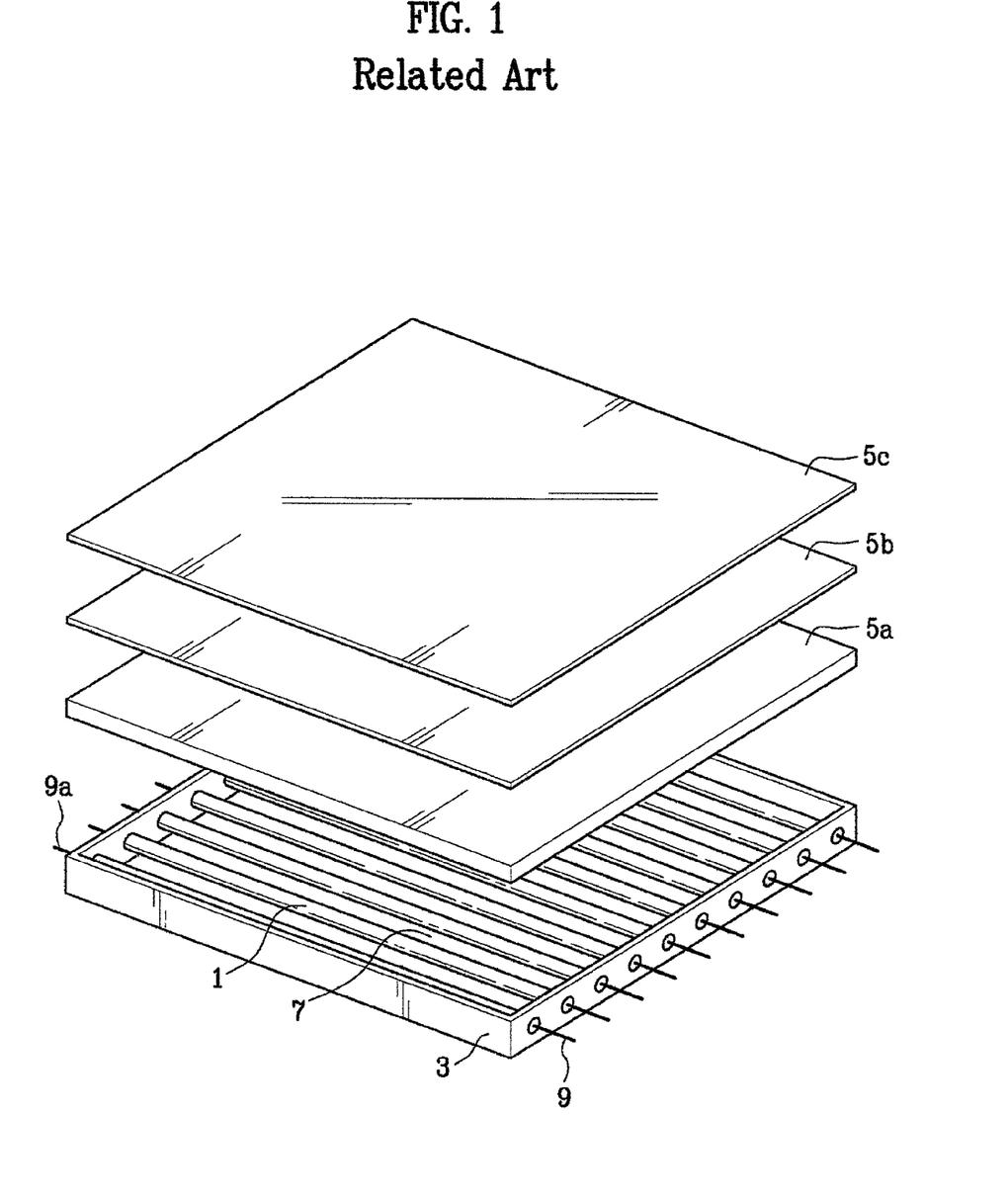
FIG. 1 is a perspective view of a direct illumination backlight in the related art.

In FIG. 1, the backlight 100 may include multiple fluorescent lamps 1, an outer case 3, and light-scattering layers 5a, 5b and 5c. The fluorescent lamps 1 may be arranged at intervals in the case 3. The case 3 may fix or support the fluorescent lamps 1 on one or both sides of the case 3.

The light-scattering layers 5a, 5b and 5c may be provided between the fluorescent lamps 1 and an LCD panel (not shown). The light-scattering layers 5a, 5b and 5c may reduce or eliminate the reflection of silhouettes of the fluorescent lamps 1 on the LCD panel, and also may enhance uniform luminance. The layers 5a, 5b, and 5c may include multiple light diffusion sheets and a diffusion plate between the fluorescent lamps 1 and the LCD panel. A reflective sheet 7 may be present inside the outer case 3 and may concentrate light emitted from the fluorescent lamps 1 on the LCD panel.

Figure 2:
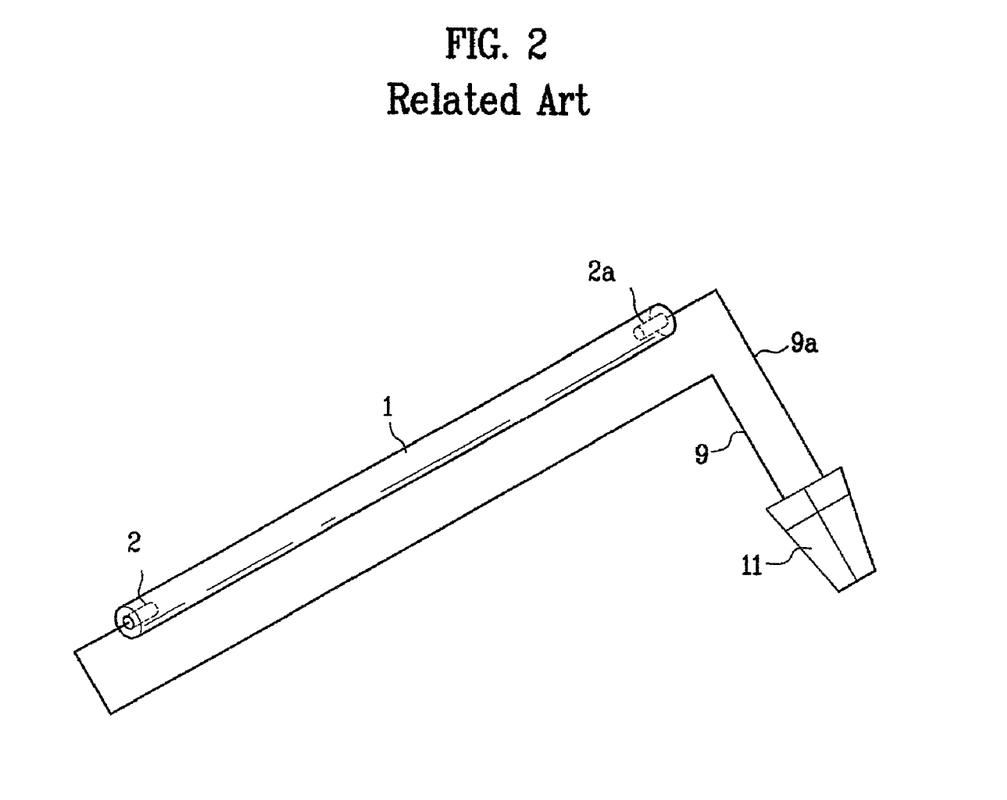
FIG. 2 is a fluorescent lamp and connector of FIG. 1.

In FIG. 2, each fluorescent lamp 1 may include internal electrodes 2a and 2b for receiving power. Each fluorescent lamp 1 may be a Cold Cathode Fluorescent Lamp (CCFL) filled with a discharge gas. Power supply wires 9a and 9b are connected to the electrodes 2a and 2b and to a driving circuit through the connector 11. The power supply wire 9b is connected to the electrode 2b and the connector 11 and the power supply wire 9a is connected to the electrode 2a and the connector 11. One or both of the power supply wires 9b and 9a may run under or around a side of the outer case 3 to meet with the connector 11 when the fluorescent lamps are positioned in the case 3.

For each of the multiple fluorescent lamps 1, power supply wires couple the lamp electrodes to a separate connector. The number of wires may be large and their arrangement or routing around the outer case 3 may become complicated, decreasing the operating efficiency, increasing the fabrication cost and complexity, and lowering the yield. In addition, the fluorescent lamp electrodes extend through holes in the outer case 3 to provide access for the power supply wires. In this configuration, the changing of a lamp and routine maintenance on the backlight 100 may be difficult.

Figure 3:
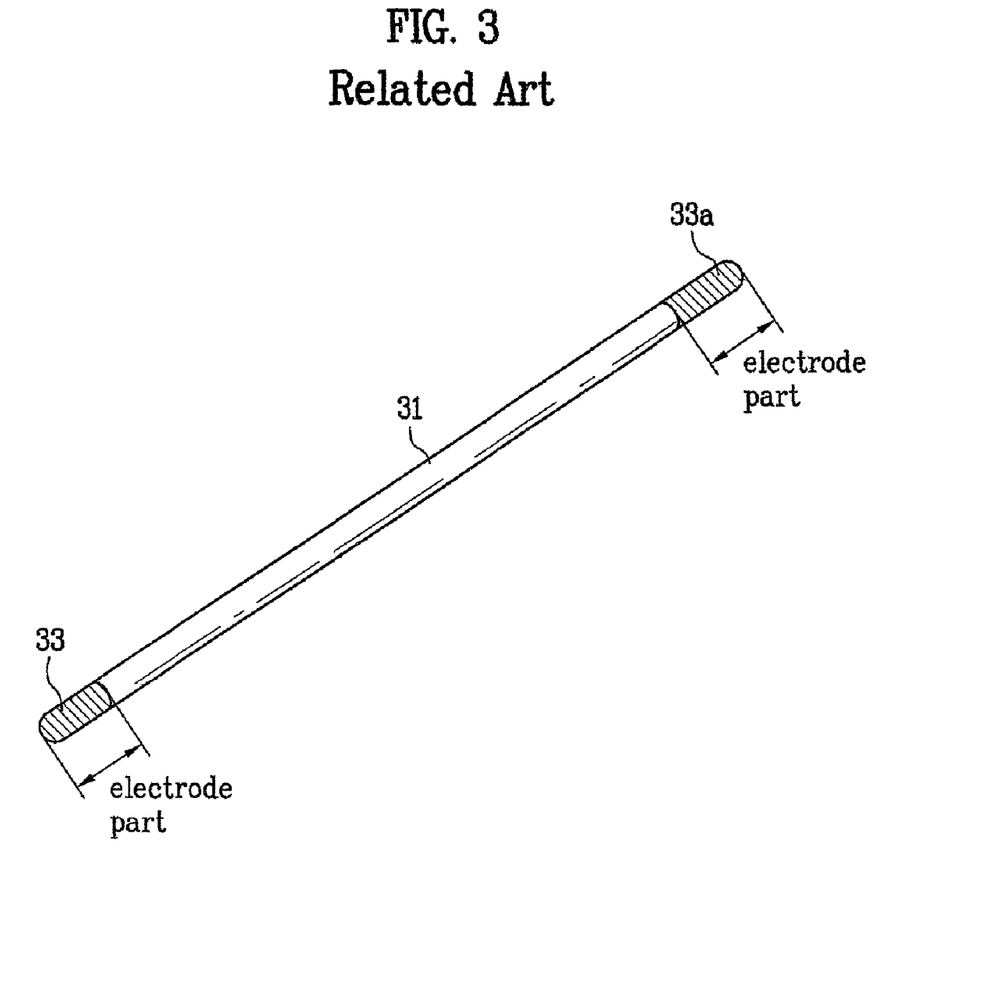
FIG. 3 is an External Electrode Fluorescent Lamp (EEFL) in the related art.

FIG. 3 shows an External Electrode Fluorescent Lamp (EEFL) 300 developed as an alternative to the fluorescent lamps 1 with internal electrodes. The EEFL 300 may include an external positive (+) electrode 33a and an external negative (−) electrode 33b at either end of a tube 31. Compared to Internal Electrode Fluorescent Lamps (IEFL) such as that shown in FIG. 2, the EEFL 300 may have a longer lifespan and may run from a single inverter, resulting in size and weight advantages.

Luminance may vary over the length of the EEFL 300. The end of the tube 31 with the positive (+) electrode 33a may have a relatively high luminance, while the end of the tube 31 with the negative (−) electrode 33b may have a relatively low luminance. The single inverter also may result in a slow start-up speed. Accordingly, the EEFL 300 is not always suitable for a large display such as a television or computer monitor.

Figure 4:
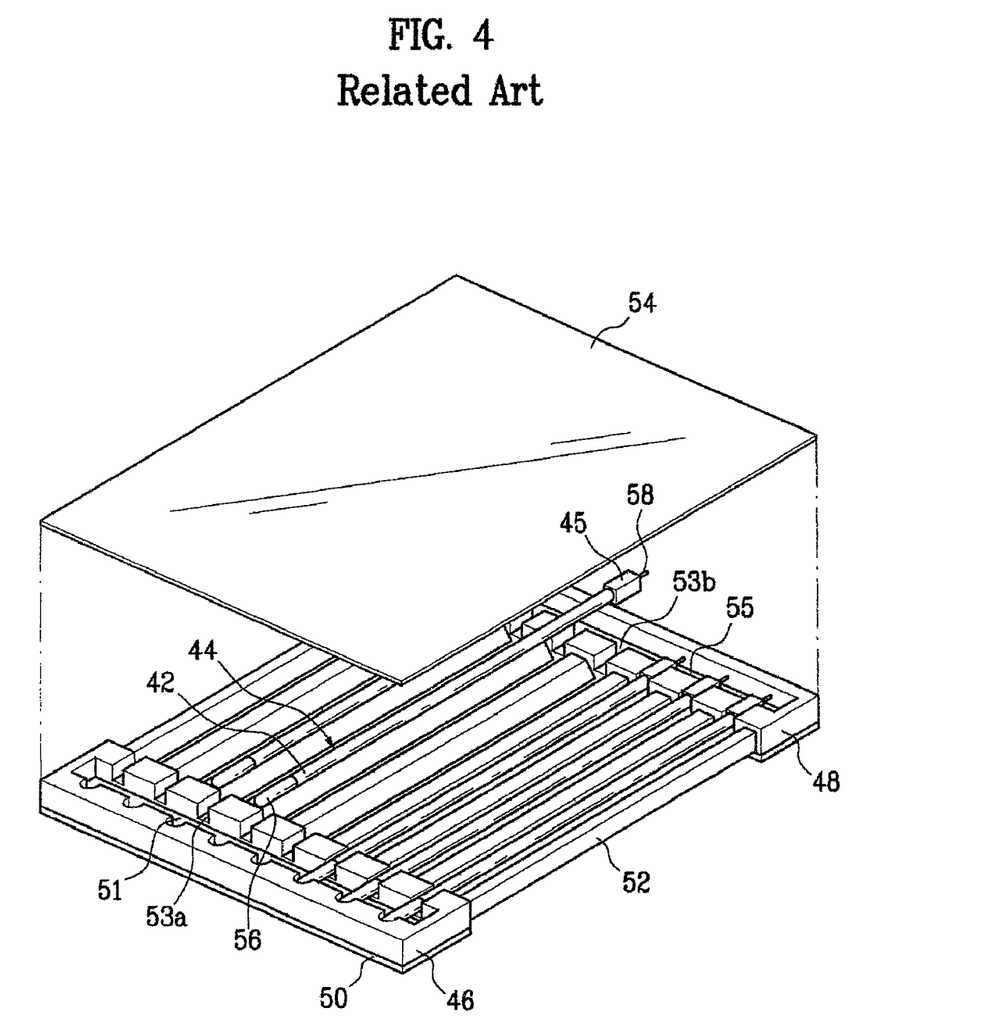
FIG. 4 is a perspective view of a direct illumination backlight in the related art.
Figure 5:
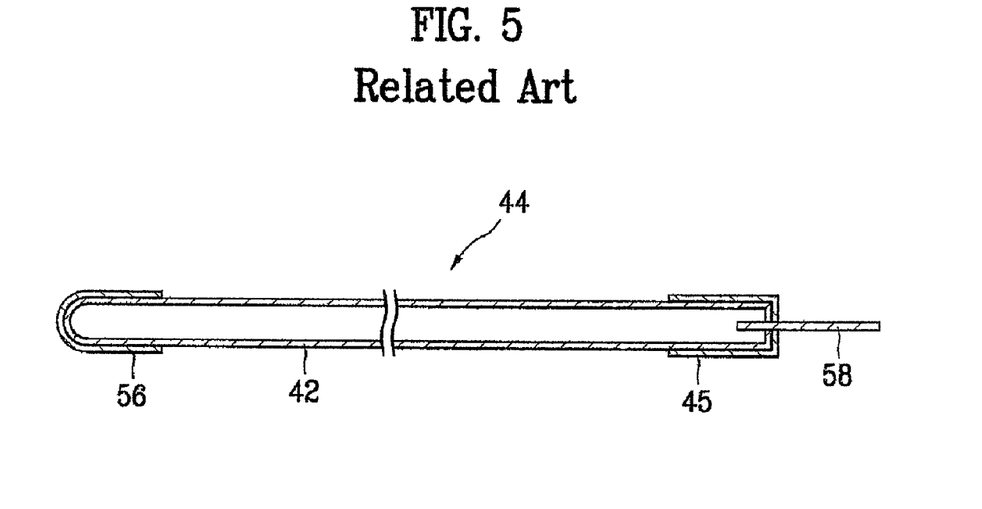
FIG. 5 is an External Internal Fluorescent Lamp (EIFL) in the related art.

FIG. 4 shows a perspective view of a direct illumination backlight 400 that includes EIFLs. The External Internal Fluorescent Lamp (EIFL) may be an alternative to the CCFL and EEFL in a direct illumination backlight. FIG. 5 shows an EIFL that may be used in the backlight 400.

In FIG. 5, the EIFL 44 may include a fluorescent substance (not shown) coated on an inner surface of a glass tube 42. The EIFL 44 may also include discharge gas such as an inert rare gas mixed with hydrargyrum injected into the glass tube 42. The EIFL 44 may also include an external electrode 56 and an internal electrode 58 that extends into the glass tube 42. The external electrode 56 may provide the positive (+) electrode on one end of the glass tube, and the internal electrode 58 may provide the negative (−) electrode at the opposite end of the glass tube 42. A component 45 on the outside of the glass tube 42 may secure or support the internal electrode 58.

In FIG. 4, the backlight 400 may include multiple EIFLs 44, supports 46 and 48, and power connection plates 50. The backlight 400 may also include a reflective sheet 52 and a light-diffusion sheet 54. The EIFLs 44 may be arranged across the backlight 400. The positive electrodes 58 of the EIFLs 44 may couple to the support 48 and the negative electrodes 56 may couple to the support 46.

Power may be applied to the EIFLs 44 through the supports 46 and 48 and through the power connection plates 50 underneath the supports 46 and 48. The reflective sheet 52 may be provided below the EIFLs 44 to reflect the light emitted from the EIFLs 44 to the LCD panel. The light-diffusion sheet 54 may be provided above the EIFLs 44 to diffuse the light reflected by the reflective sheet 52.

One or both support members 46 and 48 may comprise conductive silicon rubber that supports the EIFLs 44. The support 46 may include multiple insertion holes 53a that may accept the external electrodes 56. A conductor 51 may couple one or more external electrodes 56 to apply a positive (+) voltage to the external electrodes 56. The support 48 may include multiple insertion holes 53b that may accept the components 45 that support the internal electrodes 58. A conductor 55 may couple one or more of the internal electrodes 58 to apply the negative (−) voltage to the EIFLs 44.

The power connection plate 50 may include a copper material such as a copper sheet or a copper tape. The reflective sheet 52 may include concave or convex portions that may alternate along a longitudinal direction and may reflect the light emitted from the fluorescent lamp 44 to the LCD panel. The concave portions of the reflective sheet 52 may accept the EIFLs 44. The light-diffusion sheet 54 may be spaced from the fluorescent lamps 44 to prevent the EIFL silhouettes from being cast to the LCD panel.

Figure 6:
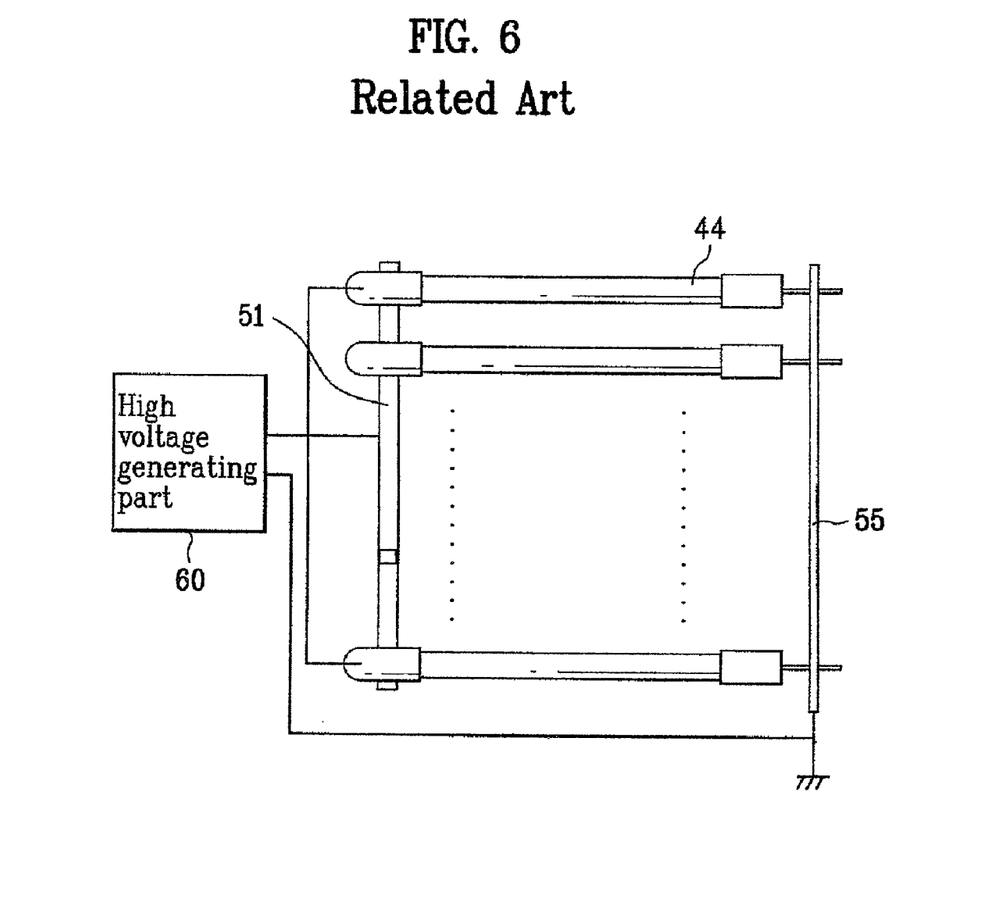
FIG. 6 is a high voltage generator connected to a direct illumination backlight.

In FIG. 6, an inverter that drives the backlight 400 may include a high voltage generator 60. The generator 60 produces the driving voltage for the parallel connected EIFLs 44. The driving voltage may be applied to the external electrodes 56 through the conductor 51, causing current flow to the internal electrodes 58 and through the lead wire 55 to generate electric discharge in the EIFLs 44. The external electrodes 56 may serve as the positive electrodes and the internal electrodes 58 may be grounded. The inverter may drive multiple EIFLs simultaneously.

As the size of the display increases, the length of the EIFLs 44 increases. One consequence is that the driving voltage that starts electric discharge in the EIFLs 44 increases. The driving voltage that the inverter is able to produce may limit the size of the display.

Figure 7:
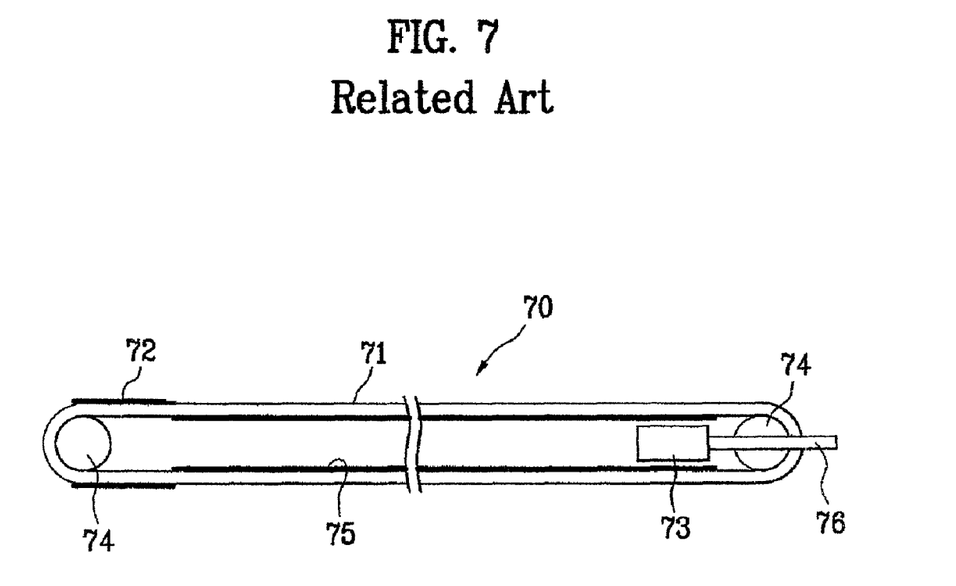
FIG. 7 is a cross-sectional view of an EIFL.

FIG. 7 shows additional details of an EIFL 70. The EIFL 70 may include an external electrode 72 outside and at one end of a tube 71, and an internal electrode 73 provided inside and at the other end of the tube 71. The EIFL 70 also includes an internal electrode glass bead 74 that may support or secure the power conductor 76, and includes an external electrode glass bead 78. The tube 71 may be coated with a fluorescent substance 75. The power conductor 76 may couple the internal electrode 73.

The EIFL fabrication process separately forms and fixes the glass beads 74 and 78 at opposite ends of the tube 71. Fabricating the glass beads 74 and 78 may be a complex and costly process. The high driving voltage applied to the external electrode 72 also may result in particularly strong electric fields between the external electrode glass bead 78 and the tube 71. The resulting stress on the EIFL 70 may reduce its reliability and operating life.

The invention is directed to a fluorescent lamp and backlight that overcomes one or more of the potential drawbacks in the related art.

SUMMARY

A backlight includes a fluorescent lamp with a tube having a first end and a second end opposite the first end. The tube may include an internal support element and internal electrode disposed at the first end of the tube. The second end of the tube may substantially omit any internal support element so that it is substantially self supporting. The backlight may also include a first drive conductor coupled to the first end of the tube and a second drive conductor coupled to the second end of the tube.

A fluorescent lamp may include an external electrode at a first end of a tube. The lamp may also include an internal electrode provided at a second end of the tube opposite the first end. A power conductor may couple to the internal electrode and may provide a connection point outside the tube for the internal electrode. An internal support element may be located at the second end of the tube, while the first end of the tube may be substantially self supporting.

Other systems, methods, features, and advantages of the invention will be, or will become apparent upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION

An External Internal Fluorescent Lamp (EIFL) may provide reliability, fabrication, and driving voltage improvements. The EIFL may omit or substantially eliminate one of the internal support elements, such as glass beads, normally present at both ends of a tube. The EIFL may improve reliability and fabrication by eliminating concentrated electric fields at an end of the EIFL. The EIFL also may reduce driving voltage requirements by recapturing a portion of the glass tube normally occupied by an internal glass bead for an external electrode. The EIFL may include the advantages of both a Cold Cathode Fluorescent Lamp (CCFL) and an External Electrode Fluorescent Lamp (EEFL).

Figure 8:
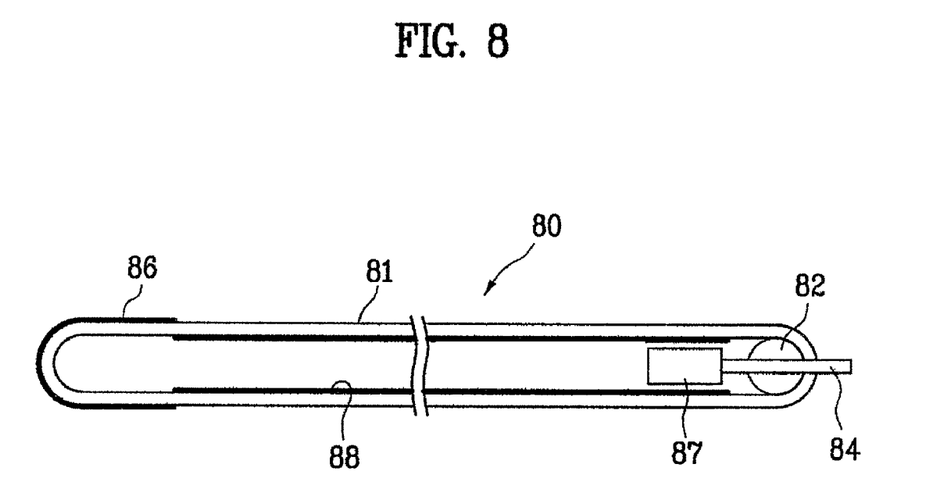
FIG. 8 is a cross-sectional view of an External Internal Fluorescent Lamp embodiment.

FIG. 8 is a cross-sectional view of an EIFL 80. The EIFL 80 is shown as a straight tube, but may take other shapes. The EIFL 80 may include an external electrode 86 that covers all or a portion of one end of a tube 81. The EIFL also may include an internal electrode 87 inside and at the other end of the tube 81. A power conductor 84 may couple the internal electrode 87 and may emerge from the tube 81. The power conductor 84 may be used to apply power to the internal electrode 87.

The EIFL 80 may also include a fluorescent substance 88 on the inner surface of the tube 81. The fluorescent substance 88 may be omitted from the all or part of the ends of tube 81 near the electrodes 86 and 87. The EIFL 80 may include a support element, shown in FIG. 8 in the form of a glass bead 82, at the internal electrode end of the tube 81. The internal electrode 87 and/or the power conductor 84 may pass in whole or in part through the glass bead 82 for support, strength, and stiffening. The EIFL 80 may omit or substantially eliminate a support element such as a glass bead at the external electrode end of the tube 81 so that it is substantially self supporting. The support elements may be formed from glass, resin, rubber, epoxy or other materials. The support element may take shapes other than a bead or circular structure, and may be uneven, rough, or otherwise irregular in shape.

In initial stages of manufacture of the EIFL 80, such as before injecting lamp gas into the tube 81, there may be little or no pressure difference between the inside and the outside of the EIFL 80. An end of the tube 81 may be sealed without forming a support element and without experiencing the effects of a pressure differential between the inside and outside of the EIFL 80. The first end that is sealed may be the external electrode end of the tube 81. The external electrode 86 may be formed in a taping, dipping, plating, or other process that forms a conductor on the external surface of the tube 81.

A pressure differential may arise at subsequent stages of manufacture of the EIFL 80. When the lamp gas has been injected into the tube 81 and one end of the tube has been sealed, the inside of the tube 81 may experience a pressure lower than the outside of the tube 81. A support element such as the glass bead 82 may be added, deposited, or formed at the opposite end of the tube 81. The internal electrode 87 and the power conductor 84 may be provided adjacent to the glass bead 82. The glass bead 82 helps prevent the pressure differential from collapsing the glass tube 81.

Forming a glass bead at one end of the lamp may simplify fabrication of the EIFL 80 and may decrease the fabrication cost by eliminating one or more process steps that form a second support element in the tube 81. In one implementation the glass bead is omitted or substantially eliminated from the external electrode end of the tube 81. A reduction in electric field concentration at the external electrode end of the tube 81 may result during EIFL operation and the reliability of the tube 81 may increase.

Without the glass bead at one end of the tube 81, an electrode may cover that end that was occupied by the glass bead. For example, the external electrode 86 may function over the area normally occupied by the glass bead at the external electrode end of the tube 81. Eliminating the glass bead may increase the effective length of the tube 81 by the diameter of the eliminated glass bead without physically lengthening the tube 81 and without a corresponding increase in drive voltage to activate the tube 81.

Figure 9:
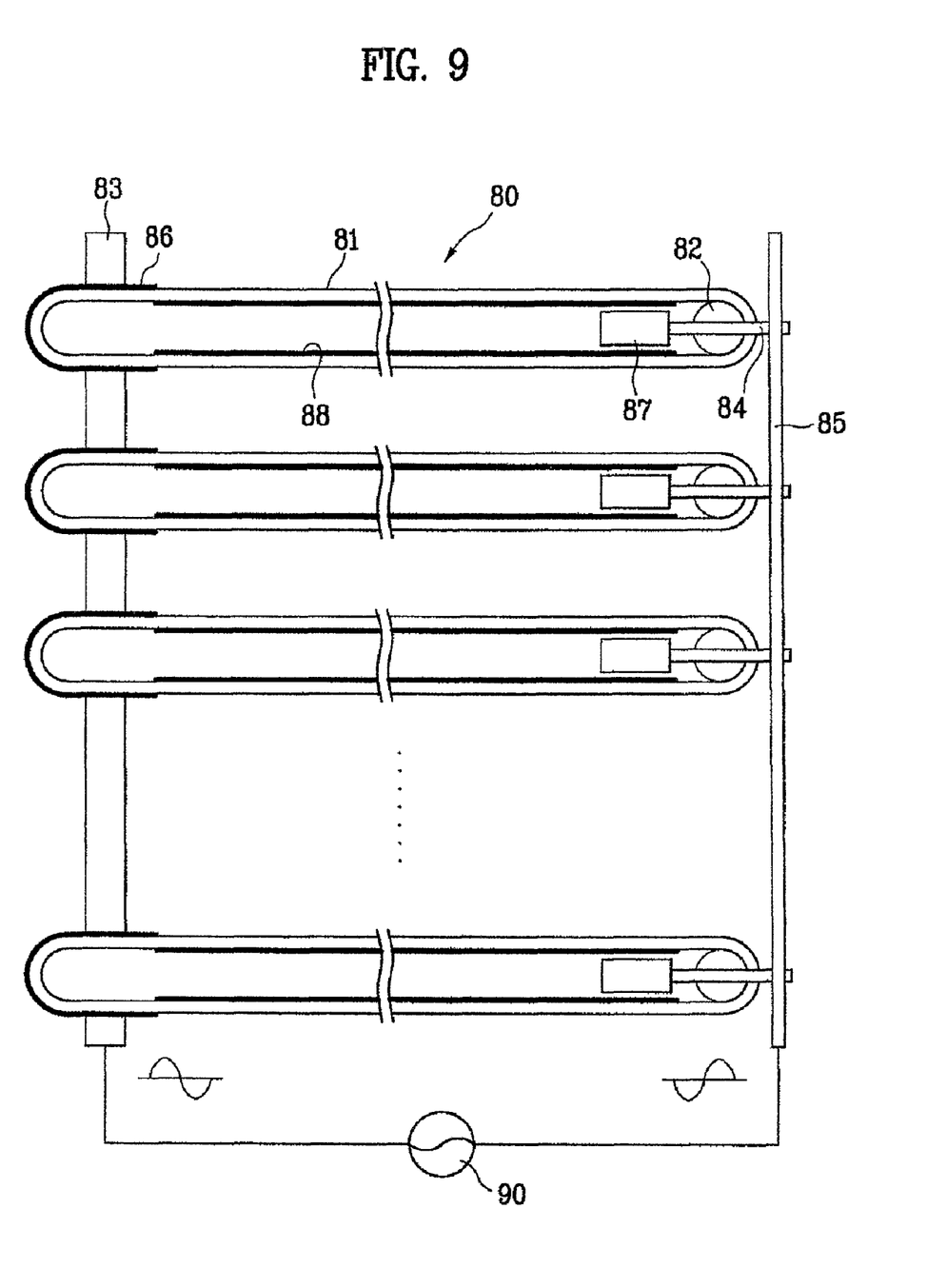
FIG. 9 is a backlight embodiment coupled to a driver.

In FIG. 9, a direct illumination backlight 900 may include one or more EIFLs 80. The EIFLs 80 may be connected in parallel at a regular or irregular spacing. A first drive conductor 83 may be provided to connect one or more external electrodes 86 of the EIFLs 80 to one another. A second drive conductor 85 may be provided to connect one or more of the power conductors 84 to one another.

The backlight 900 may also include a reflective layer (not shown) below the EIFLs 80 to reflect light emitted by the EIFLs 80 toward an LCD panel. The backlight 900 also may include one or more light diffusing layers (not shown) above the EIFLs 80 to diffuse light directly received from the EIFLs 80 or light reflected from the reflective layer. The light diffusing layers may enhance uniform illumination of the LCD panel.

An AC current or voltage source, such as an inverter 90, may connect to one or more of the EIFLs 80. The inverter 90 may drive or more of the EIFLs 80 simultaneously through the first and second drive conductors 83 and 85. In one implementation, the internal electrodes 87 may remain un-grounded or otherwise float with respect to ground, and an AC voltage may be applied to both sides of the EIFLs 80 through the internal electrodes 87 and external electrodes 86. The driving voltage waveforms 92 and 94 show that the AC voltage on the external electrodes 86 may be out of phase with the AC voltage on the internal electrodes 87. Driving the external electrodes 86 and internal electrodes 87 substantially out of phase, such as approximately 180 degrees out of phase, may reduce the magnitude of the driving voltage by one-half and may enhance stable EIFL 80 operation.

Figure 10:
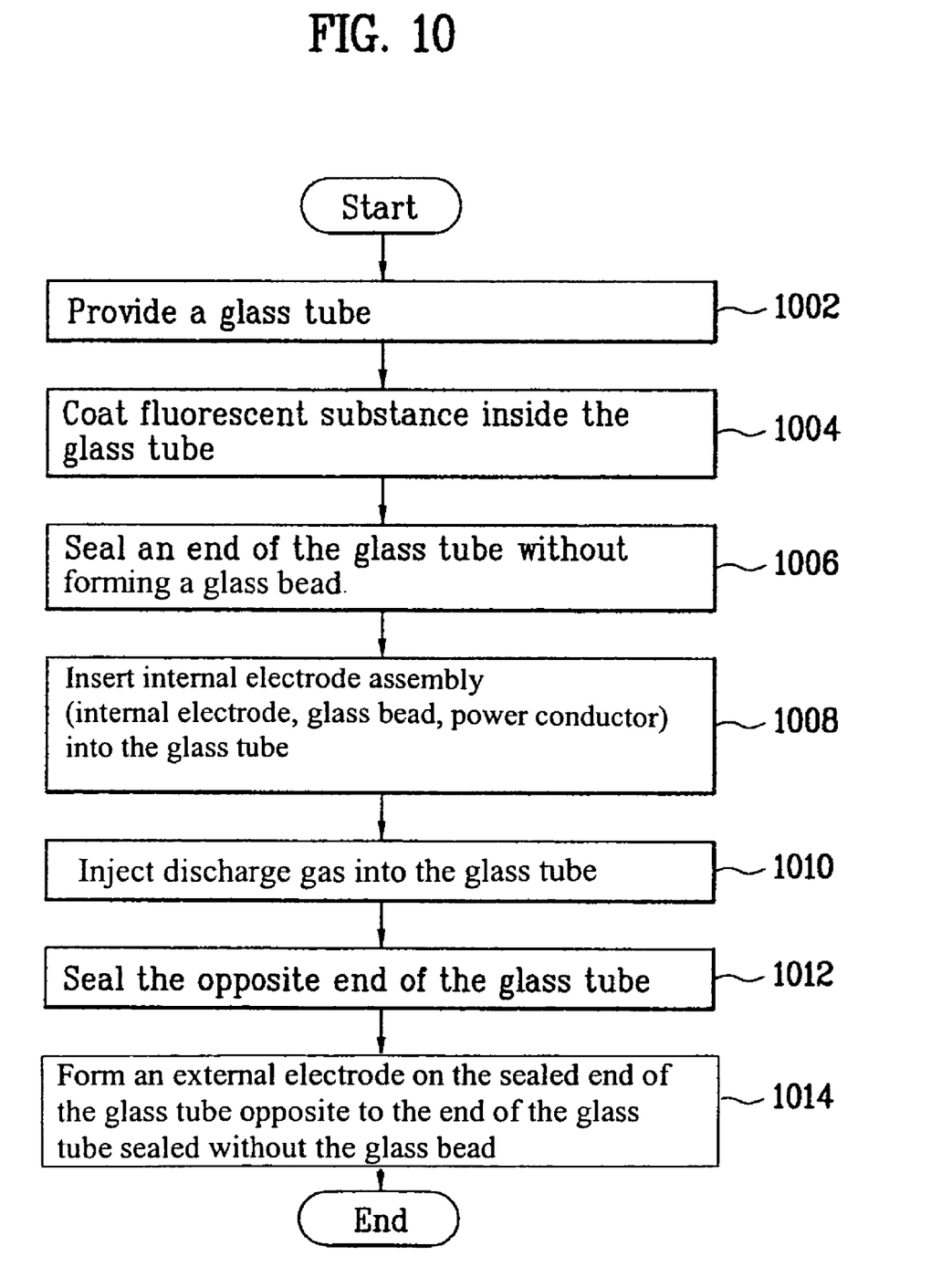
FIG. 10 is a flow diagram of assembly of an EIFL.

In FIG. 10, an assembly process for the EIFL 80 includes providing a tube 81 (Act 1002). The internal surface of the tube 81 is coated with one or more radiation absorption and re-radiation substances for any desired wavelengths, such as a fluorescent substance (Act 1004). Alternatively, the tube 81 may be coated with a substance that does not emit radiation. One end of the tube 81 is then sealed without forming a glass bead at that end (Act 1006). The glass bead may be omitted or substantially eliminated from either end of the tube 81 corresponding to the external electrode 86. In FIG. 10, the glass bead is omitted from the external electrode end of the EIFL 80.

In the open end of the tube 81, the internal electrode assembly 82, 84, and 87 may be inserted (Act 1008). The internal electrode assembly 82, 84, and 87 includes a glass bead 82, an internal electrode 87, and a power conductor 84. The glass bead 82 may be placed, deposited, or otherwise formed in the open end of the tube 81. The power conductor 84 is coupled to the internal electrode 87 and extends outside of the tube 81. The glass bead 82 may be formed adjacent to or around the internal electrode 87 and/or power conductor 84.

The tube 81 may be filled with a discharge gas (Act 1010). The discharge gas may be selected to excite the fluorescent substance that coats the internal surface of the tube 81.

The internal electrode end of the tube 81 is then sealed (Act 1012). The external electrode 86 is then formed on the end of the tube 81 opposite the internal electrode 87 (Act 1014). A dipping, taping, or other conductor deposition process may form the external electrode 86.

Figure 11:
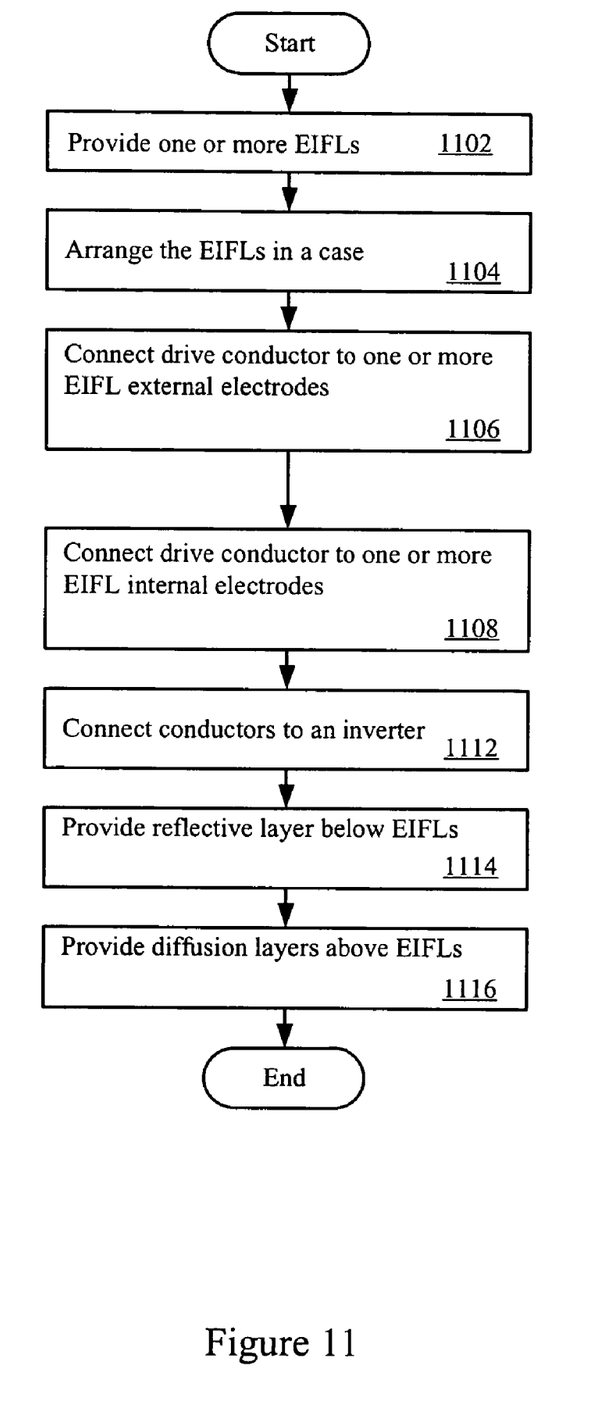
FIG. 11 is a flow diagram of assembly of a backlight.

The assembly process for a backlight shown in FIG. 11 may include providing one or more EIFLs 80 (Act 1102). The EIFLs may be arranged in a case or frame (Act 1104). A first drive conductor may connect one or more of the EIFL external electrodes together (Act 1106). One or more of the EIFL internal electrodes may connect together through a second drive conductor (Act 1108).

The conductors for the internal and external electrodes may be connected to a driving circuit for the EIFLs (Act 1110). The driving circuit may be a DC to AC inverter or other type of current or voltage driver. The backlight may also be provided with a reflective layer below the EIFLs (Act 1114). One or more diffusion layers may be provided above the EIFLs (Act 1116). The reflective layer and the diffusion layers may enhance luminance and uniform illumination of the LCD panel.

The EIFL omits or substantially eliminates a support element at one end of the tube 81. In one embodiment the support element is eliminated from the external electrode end of the EIFL. The EIFL may be effectively lengthened by the diameter of the omitted glass bead without increasing the drive voltage or current for firing the EIFL. Omitting the support element may also ease electric field concentration on one end of the tube 81, prolonging EIFL life and reliability.

It is therefore intended that the foregoing detailed description be regarded as illustrative rather than limiting, and that it be understood that it is the following claims, including all equivalents, that are intended to define the spirit and scope of this invention.

The invention claimed is:

1. A backlight comprising:
    a fluorescent lamp comprising a tube having a first end and a second end opposite the first end, an internal electrode disposed at the first end of the tube, an external electrode being disposed at the second end of the tube and covering the second end of the tube entirely, and a glass bead disposed within the first end of the tube which the internal electrode is disposed being in contact with an inner surface of the tube and supporting the internal electrode to prevent the pressure differential from collapsing the tube;
    a first drive conductor coupled to the first end of the tube; and
    a second drive conductor coupled to the second end of the tube;
    an AC voltage source applying AC voltage to the external and internal electrodes, wherein the phase of AC voltage applied to the external electrode is phase-inverted with regard to the phase of AC voltage applied to the internal electrode by 180°.

2. The backlight of claim 1, wherein the fluorescent lamp further comprises a power conductor connected to the internal electrode.

3. The backlight of claim 2, wherein the external electrode is coupled to the first drive conductor and the internal electrode is coupled to the second drive conductor.

4. The backlight of claim 1, further comprising a reflective layer disposed below the fluorescent lamp.

5. The backlight of claim 1, further comprising a light-diffusion layer disposed above the fluorescent lamp.

6. A lamp comprising:
    a tube having a first end and a second end opposite the first end;
    an external electrode being disposed at a first end of the tube and covering the first end of the tube entirely;
    an internal electrode at the second end of the tube opposite the first end; and
    a glass bead disposed at an internal side of the second end of the tube being in contact with an inner surface of the tube and supporting the internal electrode to prevent the pressure differential from collapsing the tube;
    an AC voltage source applying AC voltage to the external and internal electrodes, wherein the phase of AC voltage applied to the external electrode is phase-inverted with regard to the phase of AC voltage applied to the internal electrode by 180°.

7. The lamp of claim 6, further comprising a fluorescent substance inside the tube.

8. The lamp of claim 6, wherein the tube is a straight tube.

9. The lamp of claim 6, further comprising a power conductor that extends from the internal electrode to outside of the tube.

10. The lamp of claim 6, further comprising a discharge gas in the tube.

11. The lamp of claim 6, wherein the tube omits a fluorescent substance from at least one of the first end and the second end of the tube.

12. A method for assembling a fluorescent tube comprising:
    preparing a tube having a first end and a second end opposite the first end;
    sealing the first end of the tube without any glass bead;
    forming an internal electrode assembly in a second end of the tube opposite the first end, wherein the internal electrode assembly comprises an internal electrode, a power conductor, and a glass bead disposed within the second end of the tube being in contact with an inner surface of the tube and supporting the internal electrode to prevent the pressure differential from collapsing the tube;
    sealing the second end of the tube; and
    forming an external electrode to cover the first end of the tube entirely;
    applying an AC voltage to the external and internal electrodes, wherein the phase of AC voltage applied to the external electrode is phase-inverted with regard to the phase of AC voltage applied to the internal electrode by 180°.

13. The method of claim 12, further comprising adding a discharge gas to the tube.

14. The method of claim 12, further comprising adding radiating material into the tube.

15. The method of claim 14, wherein the radiating material comprises a fluorescent substance.

16. A method for assembling a backlight comprising:
    obtaining a fluorescent lamp comprising:
    a tube having a first end and a second end opposite the first end;
    an external electrode being disposed at the first end of the tube and covering the first end of a tube entirely;
    an internal electrode at the second end of the tube opposite the first end; and
    a glass bead disposed at an internal side of the second end of the tube being in contact with an inner surface of the tube and supporting the internal electrode to prevent the pressure differential from collapsing the tube, wherein the glass bead is not disposed with the first end of the tube;
    connecting a first drive connector to the external electrode; and
    connecting a second drive connector to the internal electrode of the tube;
    applying an AC voltage to the external and internal electrodes, wherein the phase of AC voltage applied to the external electrode is phase-inverted with regard to the phase of AC voltage applied to the internal electrode by 180°.

* * * * *